United States Patent
Inagaki

(10) Patent No.: US 11,720,371 B2
(45) Date of Patent: Aug. 8, 2023

(54) CONTROL APPARATUS, ACTIVATION METHOD THEREOF, AND ELECTRICAL EQUIPMENT

(71) Applicant: TOSHIBA TEC KABUSHIKI KAISHA, Tokyo (JP)

(72) Inventor: Yasuhiro Inagaki, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 114 days.

(21) Appl. No.: 17/348,230

(22) Filed: Jun. 15, 2021

(65) Prior Publication Data

US 2022/0197668 A1 Jun. 23, 2022

(30) Foreign Application Priority Data

Dec. 18, 2020 (JP) ................................ 2020-210605

(51) Int. Cl.
*G06F 9/4401* (2018.01)
*H04N 1/44* (2006.01)
*H04N 1/32* (2006.01)
*H04N 1/00* (2006.01)

(52) U.S. Cl.
CPC ....... *G06F 9/4418* (2013.01); *H04N 1/00896* (2013.01); *H04N 1/32272* (2013.01); *H04N 1/4486* (2013.01)

(58) Field of Classification Search
CPC .............. G06F 9/4418; H04N 1/00896; H04N 1/32272; H04N 1/4486
See application file for complete search history.

(56) References Cited

U.S. PATENT DOCUMENTS

| | | | | |
|---|---|---|---|---|
| 7,836,293 B1* | 11/2010 | Wynia | ................... | G06F 9/4405 713/1 |
| 2007/0214350 A1* | 9/2007 | Isaacson | ................. | G06F 9/441 713/2 |
| 2011/0154007 A1* | 6/2011 | Juvonen | ................ | G06F 9/4401 713/340 |
| 2011/0197053 A1* | 8/2011 | Yan | ........................... | G06F 8/63 713/1 |
| 2014/0006799 A1* | 1/2014 | Zmudzinski | .......... | G06F 1/3243 713/189 |
| 2014/0359260 A1 | 12/2014 | Utsumi | | |

(Continued)

*Primary Examiner* — Aurel Prifti
(74) *Attorney, Agent, or Firm* — Foley & Lardner LLP

(57) ABSTRACT

A control apparatus includes a processor, a storage controller, and a boot loader memory. The processor executes a control process using data stored in a main memory. The storage controller includes a storage device, stores stored data in an encrypted state if an encryption function is enabled, and stores the stored data in the storage device in a non-encrypted state if the encryption function is disabled. The stored data includes a memory image related to a state of the main memory after completion of an activation process of an operating system. The boot loader memory is configured to store instructions that cause the processor to (a) activate the operating system using the memory image in response to a determination that the encryption function is disabled and (b) activate the operating system without using the memory image in response to a determination that the encryption function is enabled.

11 Claims, 2 Drawing Sheets

(56) References Cited

U.S. PATENT DOCUMENTS

| | | | |
|---|---|---|---|
| 2015/0268968 A1* | 9/2015 | Siddiqi | G06F 13/00 |
| | | | 713/1 |
| 2018/0181411 A1* | 6/2018 | Rothman | G06F 1/3234 |
| 2020/0293357 A1* | 9/2020 | Goldmann | G06F 9/4418 |
| 2021/0064253 A1* | 3/2021 | Tonry | G06F 21/78 |
| 2022/0004506 A1* | 1/2022 | Connolly | G06F 1/3275 |
| 2022/0050926 A1* | 2/2022 | Golov | G06F 21/64 |
| 2022/0083697 A1* | 3/2022 | Shoji | G06F 21/64 |
| 2022/0360571 A1* | 11/2022 | Saluja | H04L 63/0876 |

* cited by examiner

CONTROL APPARATUS, ACTIVATION METHOD THEREOF, AND ELECTRICAL EQUIPMENT

CROSS-REFERENCE TO RELATED APPLICATION

This application is based upon and claims the benefit of priority from Japanese Patent Application No. 2020-210605, filed on Dec. 18, 2020 the entire contents of which are incorporated herein by reference.

FIELD

Embodiments described herein relate generally to a control apparatus, an activation method thereof, and electrical equipment.

BACKGROUND

In electrical equipment where an operation is controlled by a control apparatus including a processor, hibernation, which facilitates quickly returning to an operating state, is used immediately before a power source of the electrical equipment is turned off.

However, after the power source of the electrical equipment is turned on, the processor is activated, and then the process for returning from the hibernation is executed. Therefore, only a part of the activation time required from the time when the power source of the electrical equipment is turned on until the electrical equipment can be used is reduced.

Under such circumstances, it was desired to be able to reduce the time required for activation of the processor.

DETAILED DESCRIPTION

The problem to be solved by the present invention is to provide a control apparatus, an activation method thereof, and electrical equipment capable of reducing the time required to activate a processor.

In general, according to one embodiment, a control apparatus includes a processor, a storage controller, and a boot loader memory. The processor is configured to execute a control process using data stored in a main memory. The storage controller includes a storage device, and is configured to (a) store stored data in an encrypted state if an encryption function is enabled, and (b) store the stored data in the storage device in a non-encrypted state if the encryption function is disabled. The stored data includes a memory image related to a state of the main memory after completion of an activation process of an operating system by the processor. The boot loader memory configured to store instructions that, when executed by the processor, cause the processor to (a) activate the operating system using the memory image stored in the storage device in response to a determination that the encryption function is disabled and (b) activate the operating system without using the memory image stored in the storage device in response to a determination that the encryption function is enabled.

Figure 1:
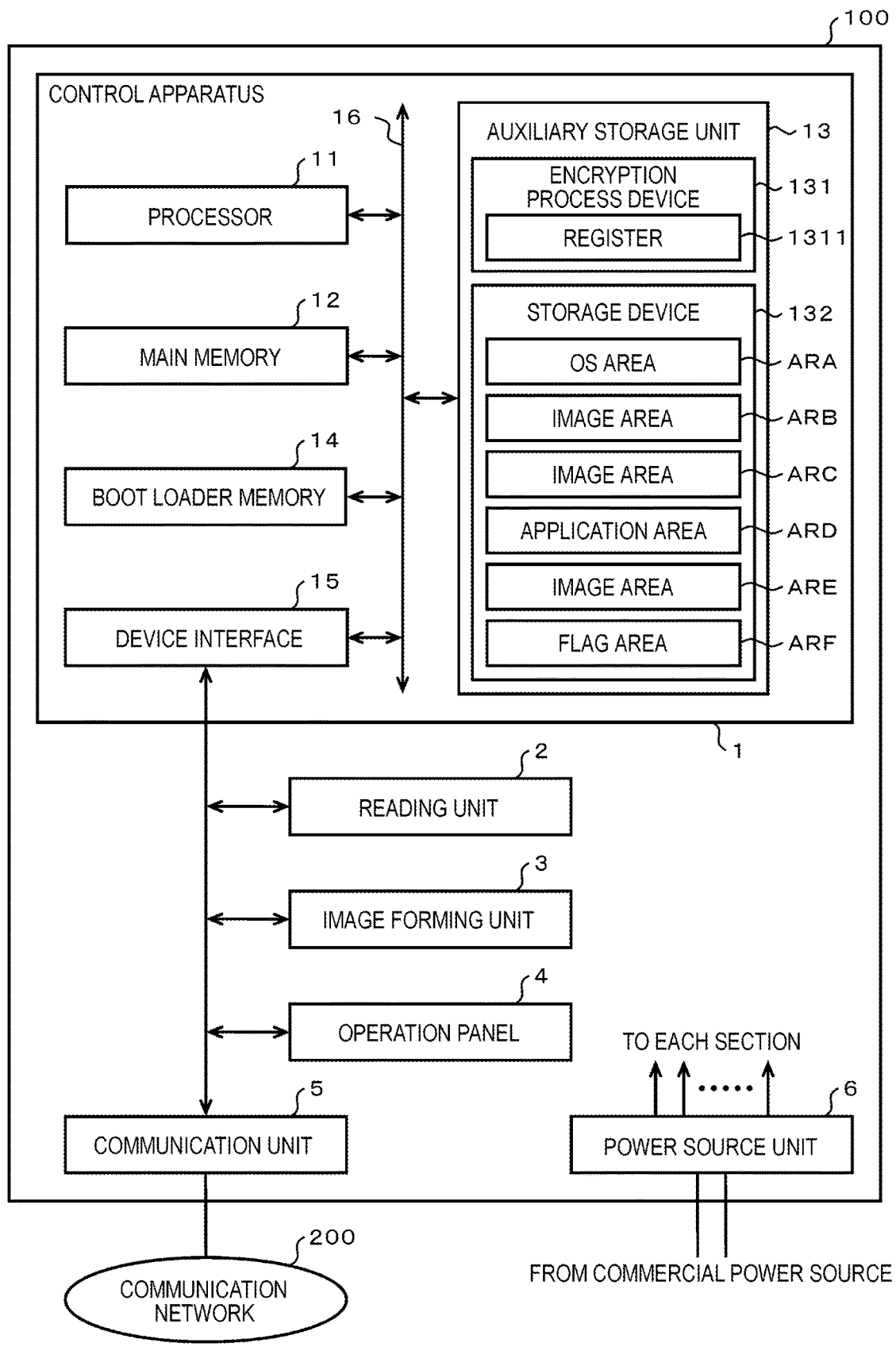
FIG. 1 is a block diagram illustrating a schematic configuration of a multifunction peripheral according to an embodiment, and a main circuit configuration of a control apparatus.

Hereinafter, an example of an embodiment will be described with reference to the accompanying drawings. In the embodiment, a multifunction peripheral will be described as an example of electrical equipment. FIG. 1 is a block diagram illustrating a schematic configuration of a multifunction peripheral 100 according to the embodiment, and a main circuit configuration of a control apparatus 1. The multifunction peripheral 100 includes the control apparatus 1, a reading unit 2, an image forming unit 3, an operation panel 4, a communication unit 5, and a power source unit 6. The multifunction peripheral 100 may include another device, such as an IC card reader.

The control apparatus 1 controls various devices provided in the multifunction peripheral 100, such as the reading unit 2 (e.g., a scanner), the image forming unit 3 (e.g., a printer, an image forming device), the operation panel 4, and the communication unit 5. In other words, the control apparatus 1 uses the multifunction peripheral 100 as a device to be controlled. The reading unit 2 reads images formed on a medium such as paper, and generates image data.

Various known reading devices, such as a flatbed scanner and an auto document feeder (ADF) scanner, can be used alone or in combination as the reading unit 2.

The image forming unit 3 forms images on the medium such as paper based on image data generated by the reading unit 2, image data received by the communication unit 5, or image data generated by the control apparatus 1. Various known image forming devices, such as an electrographic type and an ink jet type, can be used alone or in combination as the image forming unit 3.

The operation panel 4 (e.g., a user interface, an operator interface) includes an input unit (e.g., an input device), a display unit (e.g., a display), and a sound unit (e.g., a speaker). The input unit inputs instructions by an operator. Various known input devices, such as a touch panel and a key switch, can be used alone or in combination as an input unit. The display unit executes a display operation for notifying the operator of various information. Various known display devices, such as a liquid crystal display instrument and a light emitting diode (LED) bulb, can be used alone or in combination as a display unit. The sound unit outputs sounds for various types of guidance and warnings. Various known sound devices, such as a voice synthesis device and a buzzer, can be used alone or in combination as the sound unit.

The communication unit 5 (e.g., a network interface) executes a communication process for communication via a communication network 200. The communication network 200 may include a local area network (LAN). Here, various known communication devices for LAN can be used as the communication unit 5. However, as the communication network 200, various other networks, such as the Internet, a virtual private network (VPN), LAN, a public communication network, a moving object communication network, and the like, may be used. As the communication unit 5, a device that is adapted to the communication network 200 to be used, is used. The power source unit 6 receives power supplied from a commercial power source and generates operating power for various electrical devices provided in the multifunction peripheral 100.

The reading unit 2, the image forming unit 3, the operation panel 4, and the communication unit 5 are examples of devices which are targets of control by (e.g., may be controlled by) the control apparatus 1. There is also a case where the reading unit 2, the image forming unit 3, the operation panel 4, and the communication unit 5 include devices which are targets of control by the control apparatus 1. For example, there is a case where the reading unit 2 includes an automatic document conveying device, and there is also a case where the automatic document conveying device is a control target of the control apparatus 1. For example, there is a case where the image forming unit 3 includes a finisher, and there is also a case where the finisher is a control target of the control apparatus 1. Devices, such as the above-described IC card reader, which may be included in the multifunction peripheral 100 and are connected to the control apparatus 1, are also devices which are targets of control by the control apparatus 1.

The control apparatus 1 includes a processor 11, a main memory 12 (e.g., a memory device), an auxiliary storage unit 13, a boot loader memory 14 (e.g., a memory device), a device interface 15, and a transmission path 16. The processor 11, the main memory 12, the auxiliary storage unit 13, the boot loader memory 14, and the device interface 15 can communicate via the transmission path 16. The processor 11, the main memory 12, and the auxiliary storage unit 13 are connected by the transmission path 16 to form a computer for controlling the control apparatus 1. In some embodiments, two or more of the memories disclosed herein (e.g., the main memory 12, the boot loader memory 14, the storage device 132, etc.) are separate partitions or sections of the same physical memory device.

The processor 11 corresponds to the central part of the computer. The processor 11 executes information processing to realize various functions as the control apparatus 1 according to information processing programs such as an operating system, firmware, and an application program. The processor 11 also performs information processing based on the boot loader stored in the boot loader memory 14 (e.g., executes instructions contained within the boot loader memory 14). The processor 11 is, for example, a central processing unit (CPU).

The main memory 12 corresponds to the main memory part of the computer. The main memory 12 includes a non-volatile memory area and a volatile memory area. The main memory 12 stores the information processing program in the non-volatile memory area. There is also a case where the main memory 12 stores data necessary for the processor 11 to execute information processing in a non-volatile or volatile memory area. The main memory 12 uses a volatile memory area as a work area where data is appropriately rewritten by the processor 11. The non-volatile memory area is, for example, a read only memory (ROM). The volatile memory area is, for example, a random access memory (RAM).

The auxiliary storage unit 13 (e.g., a storage controller) corresponds to the auxiliary storage part of the computer. As the auxiliary storage unit 13, a storage unit with an encryption function is used in the embodiment. As the storage unit, the existing storage unit, which is called a self-encrypting drive, for example, can be used. The auxiliary storage unit 13 includes an encryption process device 131 (e.g., an encryption controller including a processor and a memory) and a storage device 132 (e.g., an auxiliary memory).

The encryption process device 131 stores the encryption flag in a built-in register 1311. The encryption flag is data that indicates whether the encryption function of the auxiliary storage unit 13 is enabled or disabled. The register 1311 is an example of a storage section that stores the data. If the encryption flag indicates that the encryption function is enabled, the encryption process device 131 writes the encrypted data obtained by encrypting data, which is a storage target, into the storage device 132 in response to a storage request from the outside. If the encryption flag indicates that the encryption function is disabled, the encryption process device 131 writes data, which is a storage target, as it is into the storage device 132 in response to a storage request from the outside. If the encryption flag indicates that the encryption function is enabled and the predetermined conditions are established, the encryption process device 131 reads the encrypted data, which is a reading target, from the storage device 132, and decrypts and outputs the read data in response to a reading request from the outside. If the encryption flag indicates that the encryption function is enabled and the above-described conditions are not established, or if the encryption flag indicates that the encryption function is disabled, the encryption process device 131 reads the data, which is a reading target, from the storage device 132 in response to a reading request from the outside and outputs the read data as it is. The above-described condition is, for example, the completion of a predetermined authentication process.

As the storage device 132, for example, known devices such as electric erasable programmable read-only memory (EEPROM), a hard disc drive (HDD), or a solid state drive (SSD) can be used alone or in combination of two or more. The storage device 132 stores data used by the processor 11 for performing various processes and data generated by the processes of the processor 11. The auxiliary storage unit 13 stores the above-described information processing program.

The boot loader memory 14 stores the boot loader. Various devices provided in the multifunction peripheral 100, such as the reading unit 2, the image forming unit 3, the operation panel 4, and the communication unit 5, are connected to the device interface 15. The device interface 15 executes the communication process for exchanging data with each of the connected devices under the control of the processor 11. As the device interface 15, for example, a known device compliant with the universal serial bus (USB) standard can be used. As the device interface 15, a known device compliant with the wireless LAN standard may be used to exchange data with various devices through wireless communication. As the device interface 15, a known interface device compliant with the peripheral component interconnect express (PCIe) standard can be used. As the device interface 15, plural types of interface devices may be respectively provided, and plural devices that are supposed to be connected to the control apparatus 1 may be connected separately. The transmission path 16 includes an address bus, a data bus, and a control signal line, and transmits data and control signals that are exchanged between the connected sections.

For example, the control apparatus 1 is configured with the processor 11, the main memory 12, the auxiliary storage unit 13, and the device interface 15 mounted on a printed board with the transmission path 16. The processor 11, the main memory 12, the auxiliary storage unit 13, and the device interface 15 may be fixedly attached to the printed board by soldering or the like, or may be removably attached to a socket or a slot attached to the printed board. For example, there is a case where the RAM included in the main memory 12 is attached to a memory slot attached to the printed board and is replaceable.

A part of the storage areas of the storage device 132 is used as an OS area ARA, image areas ARB and ARC, an application area ARD, an image area ARE, and a flag area ARF. The OS area ARA, the image areas ARB and ARC, the application area ARD, and the image area ARE, for example, are set as separate partitions.

The OS area ARA stores the operating system. The operating system may be any of an existing variety of existing operating systems. The image areas ARB and ARC store first hibernation images, respectively, as described below. The application area ARD stores an application program that describes the control process for controlling various devices, which are targets of control. The image area ARE stores a second hibernation image as described below. The flag area ARF stores image flags described below.

Next, the operation of the multifunction peripheral 100 configured as described above will be described. The operations for realizing various functions provided by existing multifunction peripherals having a copying function, a scanner function, a printer function, a facsimile function and the like may be the same as those of the existing multifunction peripherals, and thus, the description thereof will be omitted. Here, the description will be made focusing on the operations related to the activation until the operation for the above-described various functions is started when the power source of the multifunction peripheral 100 is turned on. The contents of various processes described below are only examples, and the order of some processes can be changed, some processes can be omitted, or other processes can be added as needed. For example, in the following description, the description of some of the processes will be omitted in order to easily describe the characteristic operations according to the embodiment. For example, if some errors occur, there is a case where a process for dealing with the error is performed, but the description of some of the processes will be omitted.

The multifunction peripheral 100 is configured as one of a series product group including two models with different functional levels. In other words, the multifunction peripheral 100 is configured as either a so-called standard functional model or a high functional model. Regardless of which model the multifunction peripheral 100 is configured as, the control apparatus 1 has basically the same hardware configuration. However, there is a case where the capacity of the RAM included in the main memory 12 is different in each model. There is a case where the revision supported by a PCIe device included in the device interface 15 is different. Depending on which model the multifunction peripheral 100 is configured as, at least some of the various devices, which are targets of control by the control apparatus 1, such as the reading unit 2, the image forming unit 3, the operation panel 4, and the communication unit 5, are different. For example, there is a case where, as the image forming unit 3, in a high functional model, a device with higher speed than that in a standard functional model is used. There is a case where various devices, which are targets of control by the control apparatus 1, include optional devices. For example, there is a case where a mass storage device is included as an additional device, which is the target of control by the control apparatus 1.

In the auxiliary storage unit 13, in the OS area ARA, the operating system common to each model is written, for example, if the control apparatus 1 is manufactured. In the image area ARB, the first hibernation image for the standard functional model is written, for example, if the control apparatus 1 is manufactured. In the image area ARC, the first hibernation image for the high functional model is written, for example, if the control apparatus 1 is manufactured. In other words, the storage data for the OS area ARA and the image areas ARB and ARC are common to both models.

In the application area ARD, the application program adapted to each of the standard functional model and the high functional model is selectively written, for example, if the control apparatus 1 is manufactured. In the image area ARE, the memory image of the main memory 12 is written as the second hibernation image by the processor 11 every time the power source of the multifunction peripheral 100 is turned off. In the flag area ARF, an image flag, which indicates which of the two first hibernation images is enabled, is selectively written, for example, if the control apparatus 1 is manufactured. In the embodiment, the image flag is set to a state that indicates the image area ARB if the multifunction peripheral 100 is configured as the standard functional model. The image flag is set to a state that indicates the image area ARC if the multifunction peripheral 100 is configured as the high functional model. In other words, the storage data for the application area ARD and the flag area ARF are different in both models.

There is also a case where the model of the multifunction peripheral 100 after factory shipment is changed due to maintenance work. Here, the application program of the application area ARD and the image flag of the flag area ARF are rewritten by the processor 11 under the instruction of the operator as a part of the maintenance work.

Incidentally, the first hibernation image is a memory image of the main memory 12 if the processor 11 completes the activation process of the operation based on the operating system. Therefore, there is a possibility that the first hibernation image changes depending on the hardware configuration of the control apparatus 1, but there is no influence on the various devices, which are targets of control by the control apparatus 1. Therefore, the first hibernation image is fixedly determined depending on the model of the multifunction peripheral 100.

The various information processing programs and data written into the auxiliary storage unit 13 as described above are encrypted by the encryption process device 131 and stored in the storage device 132 if the encryption flag indicates that the encryption function is enabled. Meanwhile, the various information processing programs and data written into the auxiliary storage unit 13 as described above are stored in the storage device 132 as it is without encryption by the encryption process device 131 if the encryption flag indicates that the encryption function is disabled.

The encryption process device 131 changes the encryption flag if a predetermined change instruction is received, for example, from the processor 11. The encryption process device 131 then rewrites the information processing program and data, which are already stored in the storage device 132, into the encrypted data obtained by encrypting the information processing program and the data, if the encryption flag is changed to indicate that the encryption function is enabled. The encryption process device 131 then rewrites the encrypted data, which is already stored in the storage device 132, into the decrypted information processing program and data, if the encryption flag is changed to indicate that the encryption function is disabled.

In other words, if the encryption flag indicates that the encryption function is enabled, the operating system in the OS area ARA, the first hibernation image in the image areas ARB and ARC, the application program in the application area ARD, the second hibernation image in the image area ARE, and the image flag of the flag area ARF are all considered to be encrypted data.

If the power source of the multifunction peripheral 100 is turned on, the power source unit 6 starts supplying power to each section of the multifunction peripheral 100. In response, the processor 11 starts the operation and executes the activation firmware stored in the non-volatile memory area of the main memory 12 or ROM. The activation firmware is, for example, a basic input output system (BIOS) or a unified extensible firmware interface (UEFI). The processor 11 initializes the various devices included in the control apparatus 1 based on the activation firmware, then reads the boot loader stored in the boot loader memory 14 into the main memory 12 to start execution of the boot loader separately from the activation firmware.

Figure 2:
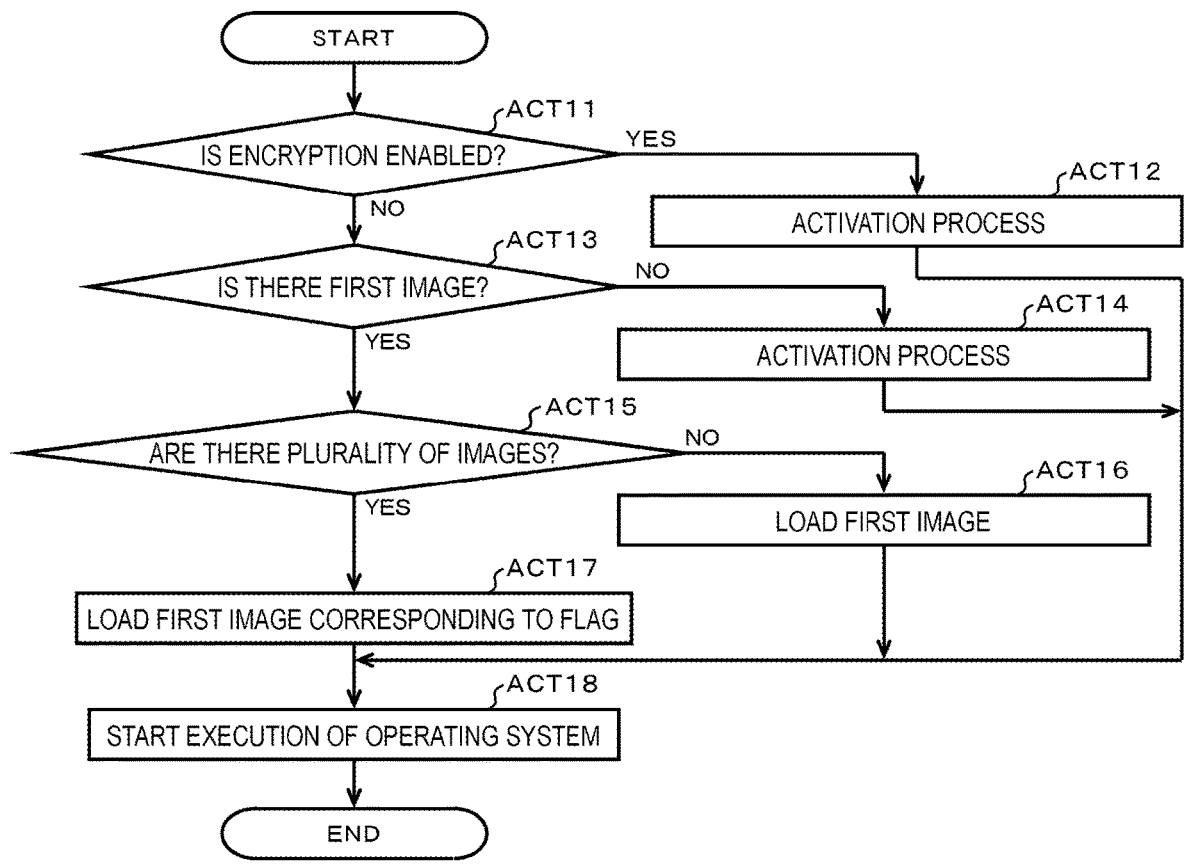
FIG. 2 is a flowchart of a boot loader.

FIG. 2 is a flowchart of the boot loader. As ACT 11, the processor 11 confirms whether the encryption function of the auxiliary storage unit 13 is enabled. The processor 11 specifically confirms whether the encryption flag indicates that the encryption function is enabled. Then, if the encryption flag stored in the register 1311 indicates that the encryption function is enabled, the processor 11 determines YES and proceeds to ACT 12.

As ACT 12, the processor 11 executes the activation process of the operating system. The activation process may be a known process, for example. In the activation process, the conditions for allowing decryption in the auxiliary storage unit 13 are established. In other words, for example, by completing authentication of the processor 11 by the encryption process device 131, the conditions for allowing decryption are established. In the activation process, the processor 11 reads the operating system (e.g., operating system data) decrypted by the encryption process device 131 from the encrypted data stored in the OS area ARA into the main memory 12. Thus, the processor 11 activates the operating system without using the first memory image. In other words, as the processor 11 executes the information processing based on the information processing program, the computer with the processor 11 as the central part functions as the second activation section.

If the encryption flag stored in the register 1311 indicates that the encryption function is disabled, the processor 11 determines NO in ACT 11, and proceeds to ACT 13. As ACT 13, the processor 11 confirms whether there is the first hibernation image. Then, if it is confirmed that the first hibernation image is not stored in any of the image areas ARB, for example, the processor 11 determines NO and proceeds to ACT 14.

As ACT 14, the processor 11 executes the activation process of the operating system. The activation process may be a known process, for example. In the activation process, there is also a case where no processing is performed to establish the conditions for allowing decryption in the auxiliary storage unit 13. In other words, for example, there is a case where the encryption process device 131 considers the completion of authentication of the processor 11 as a condition for allowing the decryption, and if the encryption function is disabled, and if the authentication of the processor 11 is not performed, the process for authentication is not included in the activation process. In the activation process, the processor 11 reads the operating system stored in the OS area ARA into the main memory 12 in an unencrypted state.

Meanwhile, for example, if it is confirmed that the first hibernation image is stored in any of the image areas ARB, the processor 11 determines YES in ACT 13 and proceeds to ACT 15. As ACT 15, the processor 11 confirms whether there are a plurality of first hibernation images. In the embodiment, for example, if it is confirmed that the first hibernation image is stored in only one of the image areas ARB and ARC, the processor 11 determines NO, and proceeds to ACT 16. As ACT 16, the processor 11 loads the first hibernation image stored in any of the image areas ARB and ARC into the main memory. Here, since the first hibernation image is stored in the storage device 132 without encryption, the processor 11 can read the first hibernation image from the auxiliary storage unit 13 without performing the activation process of the operating system.

For example, in the embodiment, if it is confirmed that the first hibernation image is stored in any of the image areas ARB, the processor 11 determines YES in ACT 15, and proceeds to ACT 17. As ACT 17, the processor 11 selects one of the plurality of first hibernation images according to predetermined conditions and loads the selected image into the main memory 12. The processor 11, for example, selects one of the image areas ARB according to the state of the image flag (e.g., an image flag setting, setting data) stored in the flag area ARF of the auxiliary storage unit 13, and loads the first hibernation image stored in the image area into the main memory 12.

Upon finishing any of ACT 12, ACT 14, ACT 16, or ACT 17, the processor 11 proceeds to ACT 18. As ACT 18, the processor 11 starts executing the operating system read into the main memory 12 separately from the boot loader. The processor 11 then ends the boot loader here. Thus, if the processor 11 proceeds from ACT 16 or ACT 17 to ACT 18, the operating system is activated using the first memory image. In other words, as the processor 11 executes the information processing based on the information processing program, the computer with the processor 11 as the central part functions as the first activation section.

Figure 3:
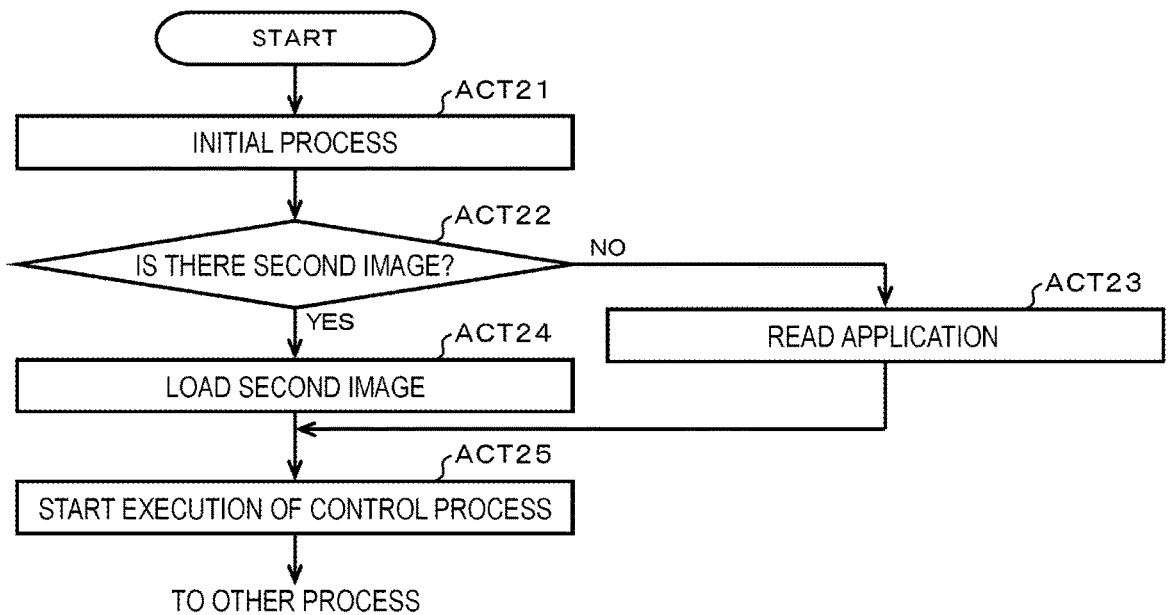
FIG. 3 is a flowchart of an operating system.

FIG. 3 is a flowchart of the operating system. If ACT 14 in FIG. 2 is executed by the boot loader, the main memory 12 is in the initial state of the execution of the operating system. Therefore, if the processor 11 executes the operating system, the processor 11 first proceeds to ACT 21. As ACT 21, the processor 11 performs the initial process after the activation. The details of the initial process will be omitted. The initial process causes the main memory 12 to be rewritten, and the contents thereof are influenced by differences in the hardware configuration of the control apparatus 1. The processor 11 then proceeds to ACT 22.

Meanwhile, if ACT 16 or ACT 17 in FIG. 2 is executed by the boot loader, the main memory 12 is set to the state after ACT 21 in FIG. 3 ends. Therefore, if the processor 11 executes the operating system, the processor 11 proceeds to ACT 22 without performing ACT 21 (i.e., the processor 11 skips ACT 21). As ACT 22, the processor 11 confirms whether there is the second hibernation image. Then, if it is confirmed that the second hibernation image is not stored in the image area ARE, for example, the processor 11 determines NO, and proceeds to ACT 23. As ACT 23, the processor 11 reads the application program stored in the auxiliary storage unit 13 into the main memory 12. Here, even if the encryption function in the auxiliary storage unit 13 is enabled, the auxiliary storage unit 13 is in a state of outputting the decrypted data due to the activation process in ACT 14 in FIG. 2. Therefore, the processor 11 can successfully read the application program.

If it is confirmed that the second hibernation image is stored in the image area ARE, the processor 11 determines YES in ACT 22, and proceeds to ACT 24. As ACT 24, the processor 11 loads the second hibernation image stored in the image area ARE of the auxiliary storage unit 13 to the main memory 12. Here, even if the encryption function in the auxiliary storage unit 13 is enabled, the auxiliary storage unit 13 is in a state of outputting decrypted data due to the activation process in ACT 14 in FIG. 2. Therefore, the processor 11 can successfully load the second hibernation image.

After reading the application program in ACT 23 or after loading the second hibernation image in ACT 24, the processor 11 proceeds to ACT 25 in both cases. By loading the second hibernation image, the application program is set to a state of being readable into the main memory 12.

As ACT 25, the processor 11 starts executing the control process based on the application program separately from the operating system based on the storage data in the main memory 12. If the processor 11 proceeds from ACT 23 to ACT 25, the processor 11 starts the control process based on the application program from the initial state. If the processor 11 proceeds from ACT 24 to ACT 25, the processor 11 returns to the control state immediately before the last time the power source of the multifunction peripheral 100 was turned off. Next, the processor 11 moves on to other processes.

As described above, the control apparatus 1 stores the memory image of the main memory 12 if the processor 11 completes the activation process of the operation based on the operating system as the first hibernation image in the auxiliary storage unit 13 in advance. The boot loader loads the first hibernation image to the main memory 12, and then the execution of the operating system is started. Accordingly, the processor 11 can omit the activation process of the operating system and complete the activation of the operating system in a shorter time than when the activation process is performed. As a result, the time required to activate the processor 11 can be reduced.

However, if the encryption function of the auxiliary storage unit 13 is enabled, and when the first hibernation image is supposed to be loaded to the main memory 12, the processor 11 cannot read the decrypted first hibernation image. Here, the control apparatus 1 activates the operating system without using the first hibernation image if it is possible to confirm by the encryption flag that the encryption function of the auxiliary storage unit 13 is enabled. Therefore, even if the encryption function of the auxiliary storage unit 13 is enabled, the system can be activated successfully.

The embodiment can be implemented in various modifications as follows. The management of whether the encryption function is enabled in the encryption process device 131 need not be performed by storing the encryption flag in the storage section, but may be managed in any other manner.

Only one of the first hibernation images may be stored in the auxiliary storage unit 13, and if YES is determined in ACT 13 of FIG. 2, the processor 11 proceeds to ACT 16, and ACT 15 and ACT 17 may not be performed. Here, the auxiliary storage unit 13 may not store the image flag.

The first hibernation image corresponding to each of the three or more models may be stored in the auxiliary storage unit 13. Here, instead of the image flag, data for identifying which of the areas stores each of the three or more first hibernation images is stored in the auxiliary storage unit 13. The processor 11 may be capable of determining which of the plurality of first hibernation images is valid by other methods, such as by storing an identifier that identifies each of the plurality of first hibernation images in the auxiliary storage unit 13 or by using a hardware setting switch.

The electrical equipment, which is the target of the control by the control apparatus 1, may be any device other than a multifunction peripheral. Any method may be adopted as a method of separately using the plurality of first hibernation images. In other words, the control apparatus 1 may be mounted in any of the plurality of separate models that do not configure a series, for example.

The loading of the second hibernation image to the main memory 12 may be performed by the boot loader. The storing and loading of the second hibernation image may not be performed.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control apparatus comprising:
a processor configured to execute a control process using data stored in a main memory;
a storage controller including a storage device, the storage controller being configured to (a) store stored data in the storage device in an encrypted state when an encryption function is enabled, and (b) store the stored data in the storage device in a non-encrypted state when the encryption function is disabled, the stored data including a plurality of memory images each related to a state of the main memory after completion of an activation process of an operating system by the processor, the storage controller being further configured to store setting data indicating which of the memory images should be selected by the processor; and
a boot loader memory configured to store instructions that, when executed by the processor, cause the processor to:
select a first memory image from the plurality of memory images based on the setting data in response to a determination that the encryption function is disabled;
activate the operating system using the first memory image in response to the determination that the encryption function is disabled; and
activate the operating system without using the memory images stored in the storage device in response to a determination that the encryption function is enabled.

2. The control apparatus of claim 1, wherein
the setting data indicates whether the encryption function is enabled or disabled, and
the instructions contained within the boot loader memory, when executed by the processor, cause the processor to determine whether the encryption function is disabled or enabled based on the setting data.

3. The control apparatus of claim 1, wherein the instructions contained within the boot loader memory, when executed by the processor, cause the processor to activate the operating system without using the memory images by:
performing an authentication with the storage controller, which causes the storage controller to decrypt operating system data; and
activating the operating system using the decrypted operating system data.

4. The control apparatus of claim 3, wherein the storage controller is configured to:
store the operating system data within the storage device in the encrypted state; and
decrypt the operating system data in response to successfully authenticating the processor.

5. The control apparatus of claim 1, wherein activating the operating system using the first memory image includes rewriting the main memory based on a hardware configuration of the control apparatus.

6. The control apparatus of claim 1, wherein
the instructions contained within the boot loader memory, when executed by the processor, cause the processor to:
determine whether the storage device contains a second memory image; and
load the second memory image in response to a determination that the storage device contains the second memory image.

7. An activation method for a control apparatus including a processor that executes a control process using data stored in a main memory, and a storage controller including a storage device, the activation method comprising:
storing stored data in the storage device in an encrypted state when an encryption function is enabled, the stored data including a plurality of memory images each related to a state of the main memory after completion of an activation process of an operating system by the processor;
storing the stored data in the storage device in a non-encrypted state when the encryption function is disabled;
storing, by the storage controller, setting data indicating which of the memory images should be selected;
selecting, by the processor, a first memory image from the plurality of memory images based on the setting data in response to a determination that the encryption function is disabled;
activating, by the processor, the operating system using the first memory image in response to the determination that the encryption function is disabled; and
activating, by the processor, the operating system without using the memory images stored in the storage device in response to a determination that the encryption function is enabled.

8. The activation method of claim 7, wherein the setting data is first setting data, further comprising:
determining, by the processor, whether the encryption function is disabled or enabled based on second setting data stored in the storage device.

9. The activation method of claim 8, wherein activating, by the processor, the operating system without using the memory images stored in the storage device includes:
attempting, by the storage controller, to authenticate the processor;
in response to successfully authenticating the processor, decrypting operating system data contained within the storage device; and
activating, by the processor, the operating system using the decrypted operating system data.

10. The activation method of claim 7, the activation method further comprising:
determining, by the processor, whether the storage device contains a second memory image; and
loading, by the processor, the second memory image in response to a determination that the storage device contains the second memory image.

11. The activation method of claim 7, wherein activating, by the processor, the operating system using the first memory image stored in the storage device includes rewriting the main memory based on a hardware configuration of the control apparatus.

* * * * *